United States Patent
Lee et al.

(10) Patent No.: US 9,977,298 B2
(45) Date of Patent: May 22, 2018

(54) DISPLAY PANEL AND DISPLAY APPARATUS HAVING THE SAME

(71) Applicant: SAMSUNG ELECTRONICS CO., LTD., Suwon-si (KR)

(72) Inventors: Won-yong Lee, Suwon-si (KR); Hyeong-sik Choi, Hwaseong-si (KR); Ju-seong Hwang, Cheonan-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 368 days.

(21) Appl. No.: 14/326,918

(22) Filed: Jul. 9, 2014

(65) Prior Publication Data

US 2015/0042896 A1  Feb. 12, 2015

(30) Foreign Application Priority Data

Aug. 12, 2013  (KR) .................... 10-2013-0095538

(51) Int. Cl.
*G02F 1/1343* (2006.01)
*G02F 1/1347* (2006.01)
(Continued)

(52) U.S. Cl.
CPC .......... *G02F 1/1347* (2013.01); *G02F 1/1396* (2013.01); *G02F 1/1397* (2013.01);
(Continued)

(58) Field of Classification Search
CPC ............. G02F 1/133707; G02F 1/1347; G02F 1/133536; G02F 1/133555;
(Continued)

(56) References Cited

U.S. PATENT DOCUMENTS 4,376,934 A   3/1983   Prohaska et al.
6,141,068 A  10/2000   Iijima
(Continued)

FOREIGN PATENT DOCUMENTS

KR  2003-0024057 A   3/2003
KR  10-2010-0100324 A   9/2010

OTHER PUBLICATIONS

Communication dated May 11, 2015, issued by the European Patent Office in counterpart European Application No. 14174831.9.
(Continued)

*Primary Examiner* — Nathanael R Briggs
*Assistant Examiner* — William Peterson
(74) *Attorney, Agent, or Firm* — Sughrue Mion, PLLC

(57) ABSTRACT

A display panel includes an upper plate including a first substrate, a first electrode layer formed on an inner surface of the first substrate, and an absorptive polarizing film formed on an outer surface of the first substrate and having a first polarization axis, a lower plate including a second substrate, a second electrode layer formed on an inner surface of the second substrate, and a reflective polarizing film formed on an outer surface of the second substrate and having a second polarization axis perpendicular or parallel to the first polarization axis, an LC layer filled between the upper plate and the lower plate, and an LC driving power supply connected between the first electrode layer and the second electrode layer and configured to selectively provide an LC driving voltage to the LC layer changing a polarization direction of incident light in the LC layer.

21 Claims, 12 Drawing Sheets

(51) Int. Cl.
*G02F 1/1335* (2006.01)
*H04N 5/74* (2006.01)
*G02F 1/139* (2006.01)
*G02F 1/1333* (2006.01)

(52) U.S. Cl.
CPC .... *G02F 1/13471* (2013.01); *G02F 1/133536* (2013.01); *G02F 1/133555* (2013.01); *G02F 1/134327* (2013.01); *H04N 5/7408* (2013.01); G02F 2001/133374 (2013.01); G02F 2001/133567 (2013.01); G02F 2201/44 (2013.01); G02F 2203/01 (2013.01); G02F 2203/02 (2013.01); G02F 2203/64 (2013.01); G02F 2203/66 (2013.01)

(58) Field of Classification Search
CPC ............. G02F 1/134327; G02F 1/1396; G02F 1/1397; G02F 2001/133374; G02F 2001/133567; G02F 2201/44; G02F 2203/01; G02F 2203/02; G02F 2203/64; G02F 2203/66
USPC ........................................................ 349/139
See application file for complete search history.

(56) References Cited

U.S. PATENT DOCUMENTS

| 6,532,048 | B1 | 3/2003 | Matsui | |
|---|---|---|---|---|
| 6,646,697 | B1 | 11/2003 | Sekiguchi et al. | |
| 7,495,719 | B2* | 2/2009 | Adachi | G02F 1/133536 |
| | | | | 349/74 |
| 8,284,472 | B2 | 10/2012 | Yoshimura et al. | |
| 2005/0280754 | A1* | 12/2005 | Kume | G02F 1/133707 |
| | | | | 349/106 |
| 2008/0309852 | A1* | 12/2008 | O'Donnell | G02F 1/133536 |
| | | | | 349/74 |

OTHER PUBLICATIONS

Communication dated Dec. 19, 2014 by the European Patent Office in related application No. 14174831.9.
Communication dated Jan. 11, 2017 issued by the European Patent Office in counterpart European Patent Application No. 14174831.9.

* cited by examiner

100

DISPLAY PANEL AND DISPLAY APPARATUS HAVING THE SAME

CROSS-REFERENCE TO RELATED APPLICATION

This application claims priority from Korean Patent Application No. 10-2013-0095538, filed on Aug. 12, 2013, in the Korean Intellectual Property Office, the disclosure of which is incorporated herein by reference in its entirety.

BACKGROUND

1. Field

Apparatuses and methods consistent with exemplary embodiments relate to a display panel using reflection of external light, and a display apparatus including the same.

2. Description of the Related Art

In general, image display apparatuses such as televisions or computer monitors provide a whole black screen in an OFF state in which an image is not displayed.

However, it is difficult for the whole black screen to positively affect the beauty of a space in which the image display apparatus is installed. The beauty of the installation space due to the black screen may be more significantly spoiled as size of the image display apparatus increases.

A method of keeping the image display apparatus in an ON state even out of use not to display the black screen may be considered. However, such a method involves considerable power consumption, and thus the method may not be preferable.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments may provide a method of displaying a specific image with minimal power consumption or without power consumption in an OFF state of an image display apparatus such as a television or a computer monitor.

According to an aspect of an exemplary embodiment, there is provided a display panel which is driven in any one mode of an external light transmission mode and an external light reflection mode. The display panel may include an upper plate including a first substrate, at least one first electrode layer formed on an inner surface of the first substrate, and a first polarizing film formed on an outer surface of the first substrate and having a first polarization axis; a lower plate including a second substrate, at least one second electrode layer formed on an inner surface of the second substrate, and a second polarizing film formed on an outer surface of the second substrate and having a second polarization axis perpendicular or parallel to the first polarization axis; a liquid crystal (LC) layer filled between the upper plate and the lower plate; and an LC driving power supply connected between the first electrode layer and the second electrode layer and configured to selectively provide an LC driving voltage to the LC layer. The LC layer may have a first arrangement in which a polarization direction of incident light is changed by a preset angle in an entire region of the LC layer when the LC driving voltage is not applied, or a second arrangement in which the polarization direction of the incident light is maintained in at least partial region of the LC layer, to which the LC driving voltage is applied, when the LC driving voltage is applied. The first polarizing film may include an absorptive polarizing film, and the second polarizing film may include a reflective polarizing film.

A direction of the first polarization axis may be perpendicular to that of the second polarization axis, and the LC driving voltage may be provided to the LC layer when the display panel is driven in the external light reflection mode.

A direction of the first polarization axis may be parallel to that of the second polarization axis, and the LC driving voltage may be provided to the LC layer when the display panel is driven in the external light transmission mode.

The upper plate may include only one first electrode layer, and the lower plate may include only one second electrode layer.

Any one of the first electrode layer and the second electrode layer may partially cover a corresponding substrate, and the other of the first electrode layer and the second electrode layer may entirely cover a corresponding substrate.

The first electrode layer and the second electrode layer may have the same shape, and each of the first and second electrode layers may partially cover a corresponding substrate.

Each of the first and second electrode layers may entirely cover a corresponding substrate.

The upper plate may include only one first electrode layer, and the lower plate may include a plurality of second electrode layers electrically isolated from each other by at least one insulating layer.

The first electrode layer may entirely cover the first substrate. Any one layer of the plurality of second electrode layers may entirely cover the second substrate, and the other layers of the plurality of second electrode layers may partially cover the second substrate.

The second electrode layer that entirely covers the second substrate may be a layer disposed closest to the second substrate among the plurality of second electrode layers.

The plurality of other second electrode layers may be shaped differently from each other.

The upper plate may include a plurality of first electrode layers electrically isolated from each other by at least one insulating layer, and the lower plate may include only one second electrode layer.

Any one layer of the plurality of first electrode layers may be formed to entirely cover the first substrate, and the other layers of the plurality of first electrode layers may be formed to partially cover the first substrate. The second electrode layer may be formed to entirely cover the second substrate.

The one first electrode layer that entirely covers the first substrate may be a layer disposed closest to the first substrate among the plurality of first electrode layers.

The plurality of other first electrode layers may be shaped differently from each other.

The upper plate may include a plurality of first electrode layers electrically isolated from each other by at least one insulating layer, and the lower plate may include a plurality of second electrode layers electrically isolated from each other by at least one insulating layer.

Any one layer of the plurality of first electrode layers may be formed to entirely cover the first substrate, and the other layers of the plurality of first electrode layers may be formed to partially cover the first substrate. Any one layer of the plurality of second electrode layers may be formed to entirely cover the second substrate, and the other layers of the plurality of second electrode layers may be formed to partially cover the second substrate.

According to an aspect of an exemplary embodiment, there is provided a display apparatus. The display apparatus may include a first display panel configured to display unspecified images; and a second display panel disposed in front of the first display panel and driven in any one mode of an external light transmission mode and an external light reflection mode. The second display panel may include an upper plate including a first substrate, at least one first electrode layer formed on an inner surface of the first substrate, and a first polarizing film formed on an outer surface of the first substrate and having a first polarization axis; a lower plate including a second substrate, at least one second electrode layer formed on an inner surface of the second substrate, and a second polarizing film formed on an outer surface of the second substrate and having a second polarization axis perpendicular or parallel to the first polarization axis; a liquid crystal (LC) layer filled between the upper plate and the lower plate; and an LC driving power supply connected between the first electrode layer and the second electrode layer and configured to selectively provide an LC driving voltage to the LC layer. The LC layer may have a first arrangement in which a polarization direction of incident light is changed by a preset angle in an entire region of the LC layer when the LC driving voltage is not applied, or a second arrangement in which the polarization direction of the incident light is maintained in at least partial region of the LC layer, to which the LC driving voltage is applied, when the LC driving voltage is applied. The first polarizing film may include an absorptive polarizing film, and the second polarizing film may include a reflective polarizing film.

The second display panel may be driven in the external light transmission mode when the display panel is turned on, and the second display panel may be driven in the external light reflection mode when the display panel is turned off.

The display apparatus may be a television.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION

Figure 1:
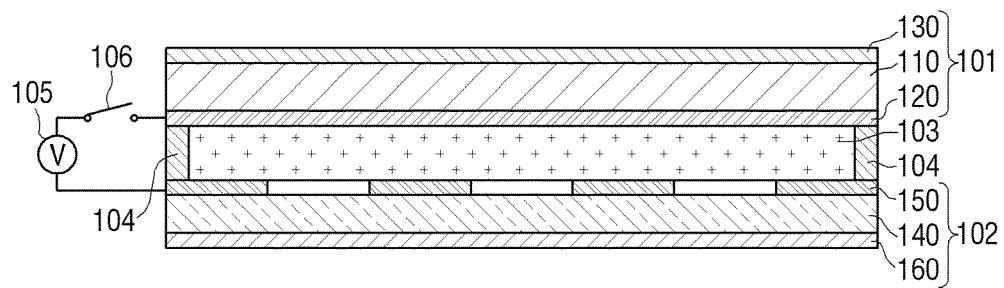
FIG. 1 is a cross-sectional view illustrating a display panel according to a first exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a cross-sectional view illustrating a display panel according to a first exemplary embodiment.

Referring to FIG. 1, a display panel 100 according to a first exemplary embodiment is a panel configured not to display a moving image but to display a specified static image. To display the specified static image, the display panel 100 uses surrounding external light provided from the sun, an artificial light source, or the like. Therefore, the display panel 100 may not display an image in a dark place having no external light or having insignificant external light.

Referring to FIG. 1, the display panel 100 includes an upper plate 101, a lower plate 102, an LC layer 103, and an LC driving power supply 105.

The upper plate 101 includes a first substrate 110, a first electrode layer 120 formed on an inner surface of the first substrate 110, and a first polarizing film 130 formed on an outer surface of the first substrate 110. The lower plate 102 includes a second substrate 140, a second electrode layer 150 formed on an inner surface of the second substrate 140, and a second polarizing film 160 formed on an outer surface of the second substrate 140.

The first and second substrates 110 and 140 and the first and second electrode layers 120 and 150 are fabricated of a transparent material. For example, the first and second substrates 110 and 140 may be fabricated of transparent glass or transparent plastic, and the first and second electrode layers 120 and 150 may be formed of indium tin oxide (ITO) or indium zinc oxide (IZO).

The first polarizing film 130 includes an absorptive polarizing film having a first polarization axis. Therefore, when any external light is incident to the first polarizing film 130, a component of the incident light having a polarization direction parallel to the first polarization axis passes through the first polarizing film 130, but a component of the incident light having a polarization direction perpendicular to the first polarization axis is absorbed in the first polarizing film 130.

The second polarizing film 160 includes a reflective polarizing film having a second polarization axis. Therefore, when any external light is incident to the second polarizing film 160, a component of the incident light having a polarization direction parallel to the second polarization axis passes through the second polarizing film 160, but a component of the incident light having a polarization direction perpendicular to the second polarization axis is reflected by the second polarizing film 160.

In the exemplary embodiment, the first polarization axis of the first polarizing film 130 is perpendicular to the second polarization axis of the second polarizing film 160. In alternative embodiments, the first polarization axis of the first polarizing film 130 may be parallel to the second polarization axis of the second polarizing film 160.

The LC layer 103 is filled between the upper plate 101 and the lower plate 102. The LC layer 103 may be retained in a space between the upper plate 101 and the lower plate 102 by an annular sealing member 104 enclosing the LC layer 103. Although not shown in FIG. 1, an alignment film configured to regularly arrange LC molecules of the LC layer 103 is provided on each of the upper plate 101 and the lower plate 102. By the alignment films, the LC layer 103 has a first molecular arrangement in which the LC molecules are 90° twisted when an LC driving voltage is not applied. When the LC layer 103 has the first molecular arrangement, a polarization direction of incident light passing through the LC layer 103 is changed by the twisted angle of the LC layer 103. The embodiment has illustrated that the twisted angle of the first molecular arrangement is 90°. Alternatively, the twisted angel of the first molecular arrangement may be 270°.

The LC driving power supply 105 is connected between the first electrode layer 120 and the second electrode layer 150 together with a switch member 106 to selectively provide the LC driving voltage to the LC layer 103. When the switch member 106 is closed, the LC driving voltage is applied between the first electrode layer 120 and the second electrode layer 150. At this time, a partial region (a region covered with both the first electrode layer and the second electrode layer) of the LC layer 103, to which the LC driving voltage is applied, has a second molecular arrangement in which twist of the LC molecules is released, and thus a polarization direction of light passing through the partial region of the LC layer 103 is not changed but is kept intact.

Figure 4:
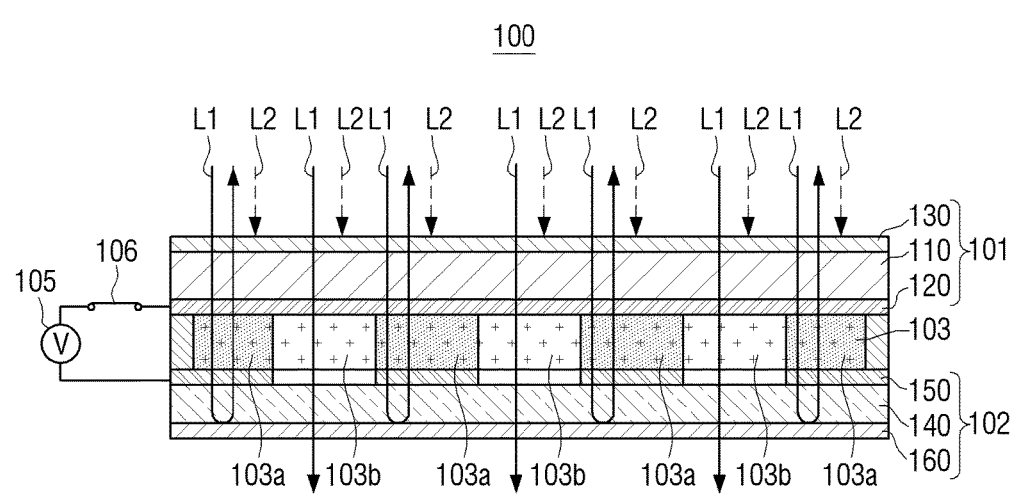
FIG. 4 is a cross-sectional view illustrating the display panel of FIG. 1, wherein the display panel is driven in an external light reflection mode.

In brief, when the switch member 106 is opened as illustrated in FIG. 1, and the LC driving voltage is not applied to the LC layer 103, the polarization direction of the incident light passing through the LC layer 103 is changed by 90°. When the switch member 106 is closed as illustrated in FIG. 4 to be described later, and the driving voltage is applied to the LC layer 103, the polarization direction of the light passing through the partial region (the region covered with both the first electrode layer and the second electrode layer) of the LC layer 103, to which the driving voltage is applied, is not changed but is kept intact.

Figure 2:
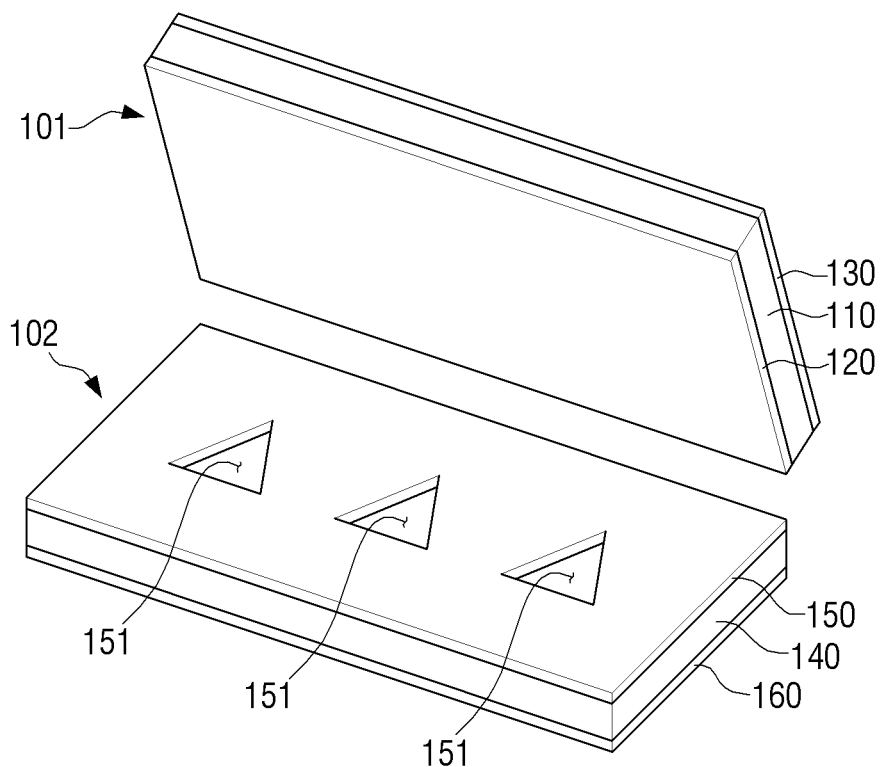
FIG. 2 is a perspective view illustrating the display panel of FIG. 1, wherein an upper plate and a lower plate are separated and an LC layer is omitted.

FIG. 2 is a perspective view of the display panel of FIG. 1, wherein the upper plate and the lower plate separated and the LC layer is omitted.

Referring to FIG. 2, the first electrode layer 120 of the upper plate 101 has a shape which entirely covers the corresponding first substrate 110. The second electrode layer 150 of the lower plate 102 includes a plurality of image-specifying openings 151, and thus has a shape which partially covers the corresponding second substrate 140. In other words, the partial region of the second substrate 140 is covered with the second electrode layer 150, but the remaining region of the second substrate 140 is not covered with the second electrode layer 150.

The display panel 100 may display a specific image corresponding to the shape of the second electrode layer 150 using reflection of external light. The display of the specific image will be described in detail with reference to FIGS. 3 to 5.

Figure 3:
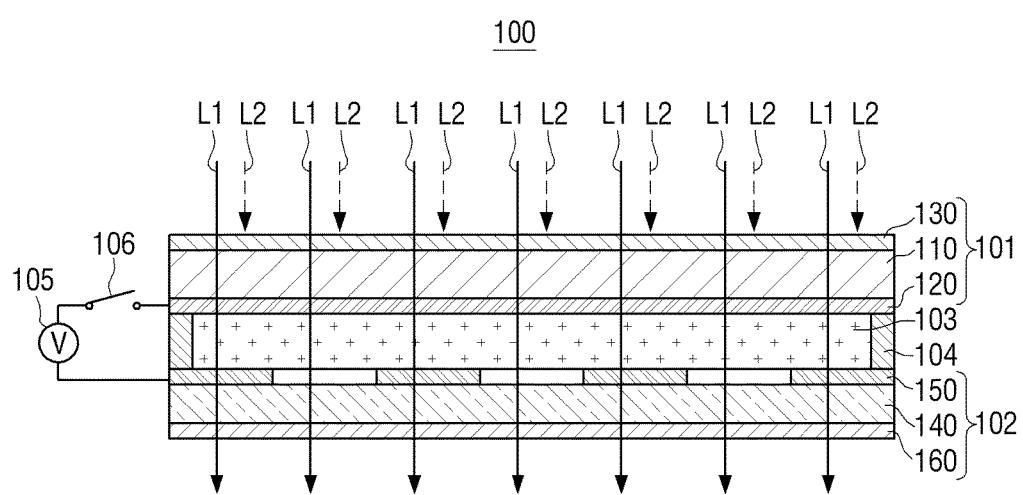
FIG. 3 is a cross-sectional view illustrating the display panel of FIG. 1, wherein the display panel is driven in an external light transmission mode.
Figure 5:
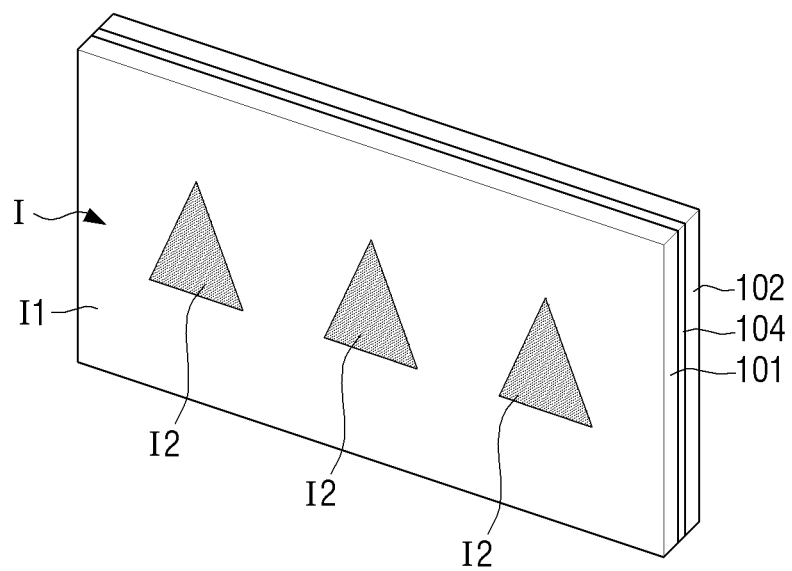
FIG. 5 is a perspective view illustrating the display panel of FIG. 1, wherein an image displayed when the display panel is driven in an external light reflection mode is illustrated.

FIG. 3 is a cross-sectional view illustrating the display panel of FIG. 1, wherein the display panel is driven in the external light transmission mode. FIG. 4 is a cross-sectional view illustrating the display panel of FIG. 1, wherein the display panel is driven in the external light reflection mode. FIG. 5 is a perspective view illustrating the display panel of FIG. 1, wherein an image displayed when the display panel is driven in the external light reflection mode is illustrated.

First, a case in which the display panel 100 is driven in the external light transmission mode will be described with reference to FIG. 3.

The reference numeral 'L1' indicated in FIG. 3 denotes an external light component (a first component) having a polarization direction parallel to a polarization axis (a first polarization axis) of the first polarizing film 130, and 'L2' indicated in FIG. 3 denotes an external light component (a second component) having a polarization direction perpendicular to the first polarization axis. In the external light transmission mode, the switch member 106 is kept in an open state, and the LC layer 103 has the first molecular arrangement in which the polarization direction is changed by 90°.

Referring to FIG. 3, when external light is incident to the upper plate 101, first components (components having a polarization direction parallel to the first polarization axis) of the external light transmit the first polarizing film 130, and then pass through the LC layer 103 so that a polarization direction thereof is changed by 90°. Therefore, the first components of the external light also transmit the second polarizing film 160 having a second polarization axis perpendicular to the first polarization axis. Second components (components having a polarization direction perpendicular to the first polarization axis) of the incident external light may not transmit the first polarizing film 130, but the second components are absorbed in the first polarizing film 130.

It can be understood that when the display panel 100 is driven in the external light transmission mode, the first components L1 of the external light incident to the display panel 100 transmit the display panel 100, and the second components L2 of the external light incident to the display panel 100 are absorbed by the first polarizing film 130. That is, when the display panel 100 is driven in the external light transmission mode, the external light incident to the display panel 100 transmits the display panel 100 or is absorbed in the display panel 100, but the external light is not reflected from the display panel.

A case in which the display panel 100 is driven in the external light reflection mode will be described with reference to FIGS. 4 and 5.

Referring to FIG. 4, in the external light reflection mode, the switch member 106 is kept in a close state, and the LC driving voltage is applied between the first electrode layer 120 and the second electrode layer 150. A first region 103a (a region covered with the second electrode layer) of the LC layer 103, to which the LC driving voltage is applied, has the second molecular arrangement in which a polarization direction is unchanged, and a second region 103b (a region uncovered with the second electrode layer) of the LC layer 103, to which the LC driving voltage is not applied, maintains the first molecular arrangement in which the polarization direction is changed by 90°).

Referring to FIG. 4, when external light is incident to the upper plate 101, second components L2 of the external light may not transmit the first polarizing film 130, but the second components are absorbed in the first polarizing film 130 as described above.

On the other hand, first components L1 of external light incident to the upper plate transmit the first polarizing film 130. Portions of the first components L1 transmitting the first polarizing film 130, which arrive at the second regions 103b of the LC layer 103, also transmit the second polarizing film 160. Portions of the first components L1 transmitting the first polarizing film 130, which arrive at the first regions 103a of the LC layer 103, are reflected by the second polarizing film 160.

When it is noted that the second regions 103b of the LC layer 103 are regions corresponding to the image-specifying openings 151 of the second electrode layer 150, it can be understood that portions of the first components L1 of the external light, which arrive at the image-specifying openings 151 of the second electrode layer 150, pass through the display panel 100, but portions of the first components L1 of the external light, which may not arrive at the image-specifying openings 151 of the second electrode layer 150, are reflected toward a front of the display panel 100.

Referring to FIG. 5 based on the above description, dark regions I2 corresponding to the image-specifying openings 151 of the second electrode layer 150 and a bright region I1 enclosing the dark regions I2 are displayed on a front surface of the display panel 100. A specific image I is formed by a combination of the dark regions I2 and the bright region I1. The image I may be understood to be specified by a shape of the second electrode layer 150.

The image I displayed by the display panel 100 has a form having three triangular areas 12. In alternative embodiments, the image I displayed by the display panel 100 may be variously changed by changing a shape, a size, density, and the number of the image-specifying openings 151 formed in the second electrode layer 150. As a non-limiting example, the display panel 100 may represent a work of art such as a landscape as a black and white image by a combination of fine bright regions and fine dark dots.

As described above, in the embodiment, the first polarization axis of the first polarizing film 130 is perpendicular to the second polarization axis of second polarizing film 160. Therefore, the display panel 100 is driven in the external light transmission mode when the switch member 106 is opened, and the display panel 10 is driven in the external light reflection mode when the switch member 106 is closed. In an alternative embodiment, when the first polarization axis of the first polarizing film 130 is parallel to the second polarization axis of second polarizing film 160, the display panel 100 is driven in the external light reflection mode when the switch member 106 is opened, and the display panel 100 is driven in the external light transmission mode when the switch member 106 is closed.

Figure 6:
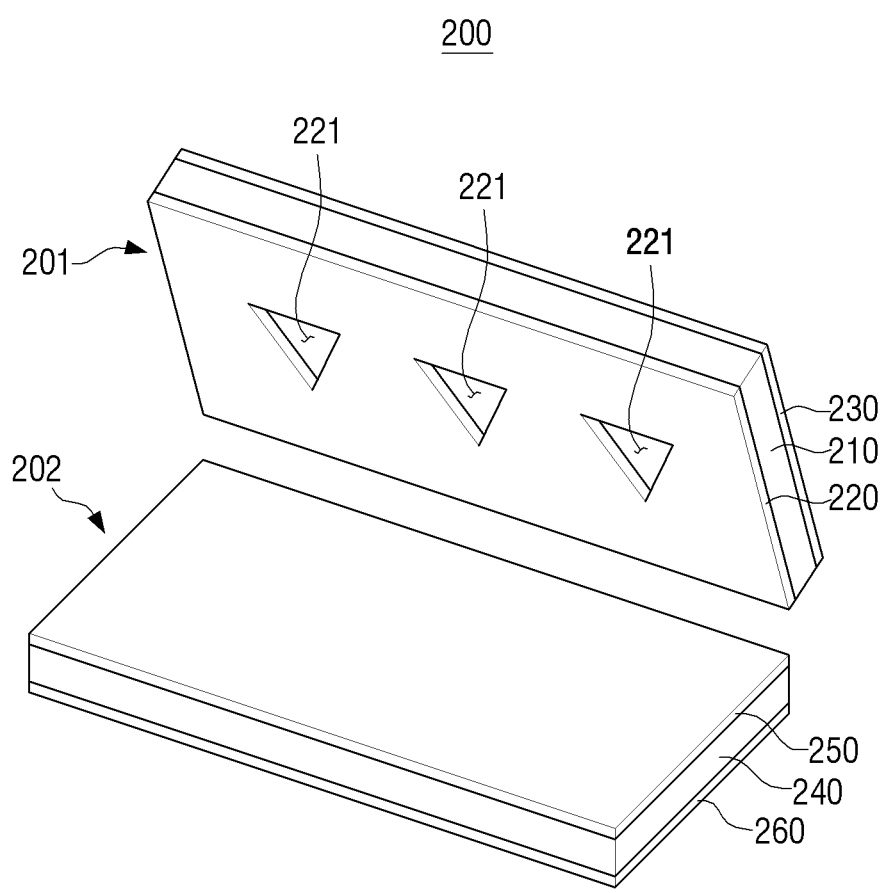
FIG. 6 is a perspective view illustrating a display panel according to a second exemplary embodiment, wherein an upper plate and a lower plate are separated and an LC layer is omitted.

FIG. 6 is a perspective view of a display panel according to a second exemplary embodiment, wherein an upper plate and a lower plate are separated and an LC layer is omitted.

Referring to FIG. 6, a display panel 200 according to the second exemplary embodiment includes an upper plate 201 including a first substrate 210, a first electrode layer 220, and a first polarizing film 230, and a lower plate 202 including a second substrate 240, a second electrode layer 250, and a second polarizing film 260.

The substrates 210 and 240 and the polarizing films 230 and 260 of the display panel 200 are the same as the substrates 110 and 140 and the polarizing films 130 and 160 of the display panel 100 according to the first exemplary embodiment.

The first electrode layer 220 of the display panel 200 has the same shape as the second electrode layer 150 of the display panel 100. Therefore, the first electrode layer 220 of the display panel 200 has image-specifying openings 221 and partially covers the corresponding first substrate 210. The second electrode layer 250 of the display panel 200 has the same shape as the first electrode layer 120 of the display panel 100. Therefore, the second electrode layer 250 of the display panel 200 entirely covers the corresponding second substrate 240.

Like the display panel 100 as described above, even in the display panel 200 according to the second exemplary embodiment, when the display panel 200 is driven in the external light reflection mode, first components L1 of incident light corresponding to the image-specifying openings 221 of the first electrode layer 220 transmits the display panel 200, and first components L1 of the incident light not corresponding to the image-specifying openings 221 of the first electrode layer 220 are reflected by the second polarizing film 260.

Therefore, like the display panel 100, the display panel 200 according to the second exemplary embodiment displays an image I in the external light reflection mode as illustrated in FIG. 5, and the image I includes dark regions I2 corresponding to the image-specifying openings 221 of the first electrode layer 220.

It can be understood that the display of a specific image by the display panel using reflection of external light like the display panels 100 and 200 may be obtained by fabricating any one of an electrode layer of an upper plate and an electrode layer of a lower plate in a shape corresponding to the specific image, and fabricating the other electrode layer in a shape entirely covering a corresponding substrate. Alternatively, both the electrode layer of the upper plate and the electrode layer of the lower plate may be fabricated in a shape corresponding to a specific image to be displayed.

Figure 7:
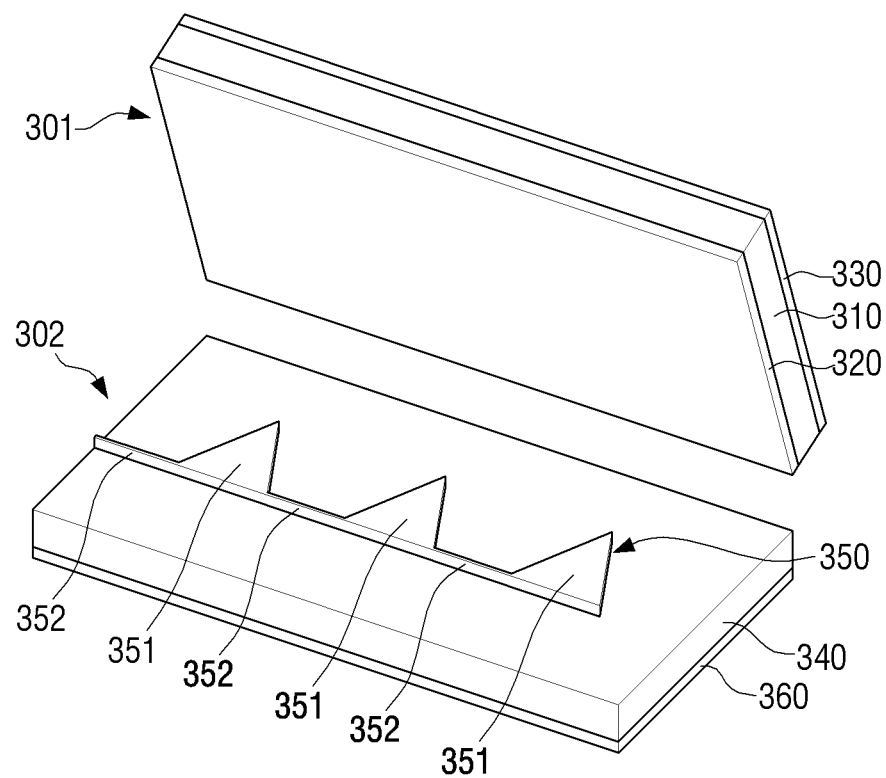
FIG. 7 is a perspective view illustrating a display panel according to a third exemplary embodiment, wherein an upper plate and a lower plate are separated and an LC layer is omitted.

FIG. 7 is a perspective view of a display panel according to a third exemplary embodiment, wherein an upper plate and a lower plate are separated and an LC layer is omitted.

Referring to FIG. 7, a display panel 300 according to the third exemplary embodiment includes an upper plate 301 including a first substrate 310, a first electrode layer 320, and a first polarizing film 330, and a lower plate 302 including a second substrate 340, a second electrode layer 350, and a second polarizing film 360.

The upper plate 301 of the display panel 300 is the same as the upper plate 101 of the display panel 100 according to the first exemplary embodiment. The second substrates 340 and the second polarizing films 360 of the display panel 300 are the same as the second substrate 140 and the second polarizing film 160 of the display panel 100 according to the first exemplary embodiment.

The second electrode layer 350 of the display panel 300 is similar to the second electrode layer 150 of the display panel 100 according to the first exemplary embodiment in that the second electrode layer 350 partially covers the second substrate 340. However, a shape of the second electrode layer 350 of the display panel 300 is different from that of the second electrode layer 150 of the display panel 100 according to the first exemplary embodiment. As illustrated in FIG. 7, the second electrode layer 350 of the display panel 300 includes three image-specifying regions 351, and connection lines 352 configured to interconnect the image-specifying regions 351, and electrically connect the image-specifying regions 351 to an LC driving power supply (not shown).

Unlike the display panels 100 and 200 including the electrode layer having image-specifying openings to specify an image, the display panel 300 according to the exemplary embodiment includes the electrode layer 350 not having the image-specifying openings but having image-specifying regions 351 to form a specific image. In other words, the display panels 100 and 200 include the electrode layer configured to specify the image in an intaglio manner, but the display panel 300 according to the exemplary embodiment includes the electrode layer configured to specify the image in an embossing manner.

Figure 8:
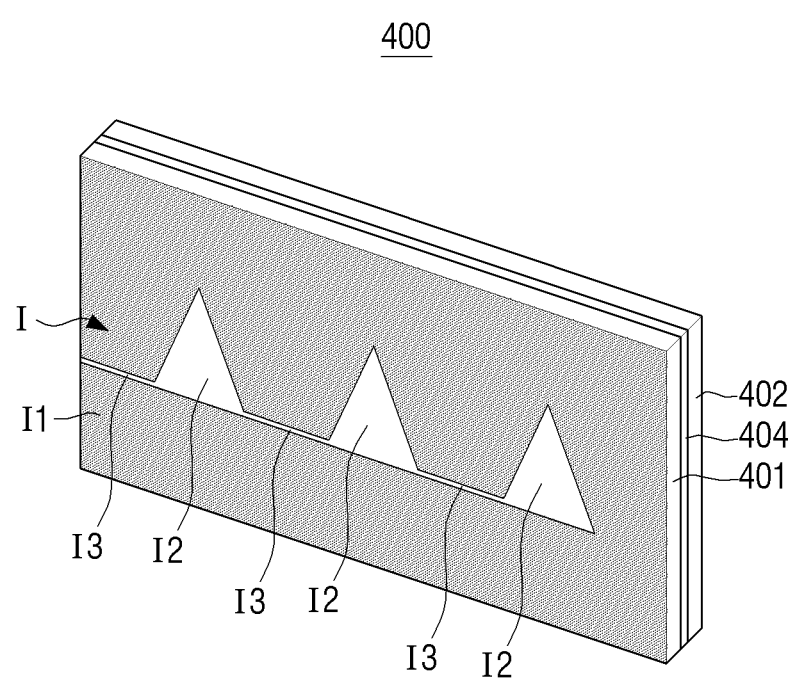
FIG. 8 is a perspective view illustrating the display panel of FIG. 7, wherein an image displayed when the display panel is driven in an external light reflection mode is illustrated.

An image illustrated in FIG. 8 may be displayed through the display panel 300. FIG. 8 is a perspective view of the display panel of FIG. 7, and illustrates an image displayed when the display panel is driven in the external light reflection mode.

As illustrated in FIG. 8, when the display panel 300 is driven in the external light reflection mode, the display panel 300 displays an image I configured of bright regions I2 and I3 having a shape corresponding to the shape of the second electrode layer 350, and a dark region I1 enclosing the bright regions I2 and I3. The bright regions I2 and I3 have the shape corresponding to the shape of the second electrode layer 350 since only portions of first components (components parallel to a polarization axis of the first polarizing film) of external light incident to the display panel 300, which arrive at the second electrode layer 350, are reflected.

The bright regions I2 and I3 of the image I illustrated in FIG. 8 include the regions I2 corresponding to the image-specifying regions 351 of the second electrode layer 350 and the regions I3 corresponding to the connection lines 352 of the second electrode layer 350. The connection lines 352 of the second electrode layer 350 may be formed as thinly as possible so that the regions I3 corresponding to the connection lines 352 of the second electrode layer 350 are not easily viewable.

In the display panel 300 according to the third exemplary embodiment, the image-specifying regions 351 are included in the second electrode layer 350 of the lower plate 302. In alternative embodiments, the image-specifying regions may be included in the first electrode layer 320 of the upper plate 301.

Figure 9:
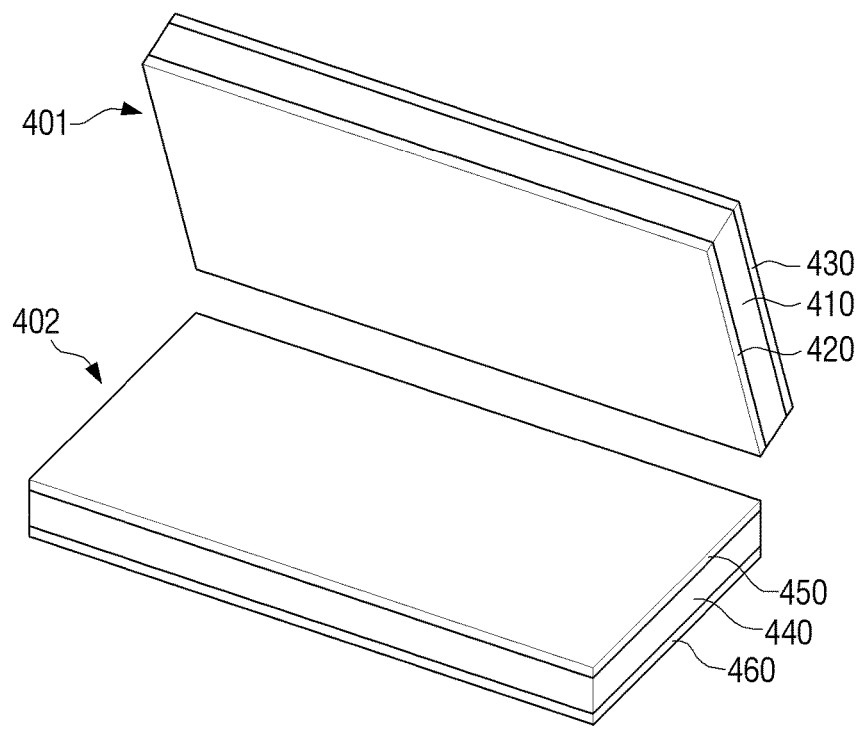
FIG. 9 is a perspective view illustrating a display panel according to a fourth exemplary embodiment, wherein an upper plate and a lower plate are separated and an LC layer is omitted.

FIG. 9 is a perspective view of a display panel according to a fourth exemplary embodiment, wherein an upper plate and a lower plate are separated and an LC layer is omitted.

Referring to FIG. 9, a display panel 400 according to the fourth exemplary embodiment includes an upper plate 401 including a first substrate 410, a first electrode layer 420, and a first polarizing film 430, and a lower plate 402 including a second substrate 440, a second electrode layer 450, and a second polarizing film 460.

The display panel 400 according to the fourth exemplary embodiment is different from the display panels 100, 200, and 300 in that both the first electrode layer 420 of the upper plate 401 and the second electrode layer 450 of the lower plate 402 entirely cover the corresponding substrates in the display panel 400.

Unlike the display panels 100, 200, and 300, in the display panel 400 according to the fourth exemplary embodiment, all first components L1 (components parallel to a polarization axis of the first polarizing film) of external light are reflected by the second polarizing film 460 in the external light reflection mode.

Therefore, the display panel 400 according to the fourth exemplary embodiment may provide a mirror function other than the image display function in the external light reflection mode.

Figure 10:
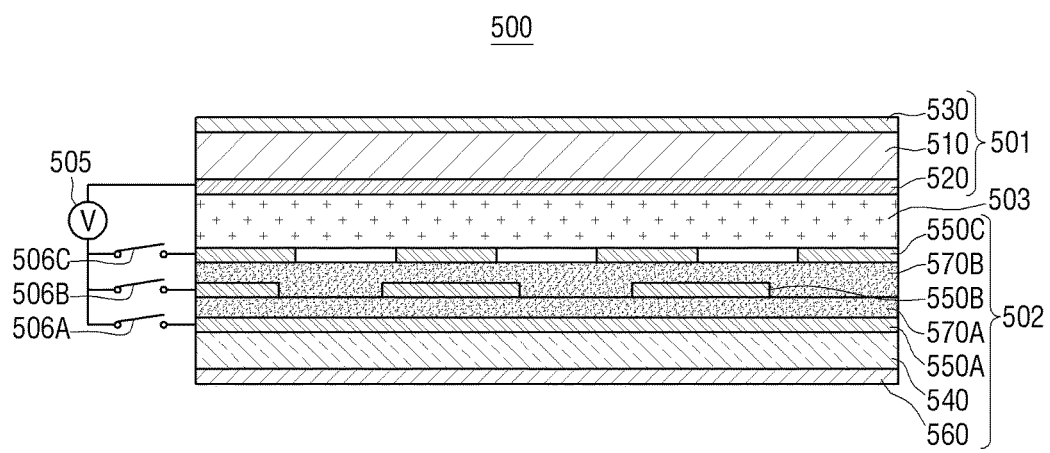
FIG. 10 is a cross-sectional view illustrating a display panel according to a fifth exemplary embodiment.

FIG. 10 is a cross-sectional view illustrating a display panel according to a fifth exemplary embodiment.

Referring to FIG. 10, a display panel 500 according to the fifth exemplary embodiment includes an upper plate 501, a lower plate 502, an LC layer 503, and a LC driving power supply 505.

The upper plate 501 includes a first substrate 510, a first electrode layer 520, and a first polarizing film 530. The components 510, 520, and 530 of the upper plate 501 are the same as the components 110, 120, and 130 of the upper plate 101 according to the first exemplary embodiment. It can be seen that the first electrode layer 520 of the upper plate 501 entirely cover the corresponding first substrate 510.

The lower plate 502 includes a second substrate 540, three second electrode layers 550A, 550B, and 550C, two insulating layers 570A and 570B, and a second polarizing film 560. The second substrate 540 and the second polarizing film 560 of the lower plate 502 are the same as the second substrate 140 and the second polarizing film 160 of the lower plate 102 according to the first exemplary embodiment. The three second electrode layers 550A, 550B, and 550C are electrically isolated by the two insulating layers 570A and 570B. The second electrode layer 550A disposed closest to the second substrate 540 has a shape which entirely covers the second substrate 540. Each of the remaining two second electrode layers 550B and 550C has a shape which partially covers the second substrate 540 to specify an image displayed by the display panel 500 in an intaglio manner or in an embossing manner.

The LC layer 503 and the LC driving power supply 505 are the same as the LC layer 103 and the LC driving power supply 105 according to the first exemplary embodiment. The display panel 500 includes three switch members 506A, 506B, and 506C configured to connect the LC driving power supply 505 to the three second electrode layers 550A, 550B, and 550C. Therefore, an LC driving voltage provided from the LC driving power supply 505 may be selectively applied to each of the second electrode layers 550A, 550B, and 550C.

For clarity, the three switch members 506A, 506B, and 507C are referred to as a first switch member 506A, a second switch member 506B, and a third switch member 506C. When the display panel 500 is driven in the external light reflection mode, any one of the three switch members 506A, 506B, and 506C is closed, and the remaining two switch members are opened. For example, when the first switch member 506A is closed in the external light reflection mode, the electrode layer 550A entirely covers the second substrate 540, and the display panel 500 provides a minor function. Alternatively, when the second switch member 506B or the third switch member 506C is closed in the external light reflection mode, the display panel 500 displays one image specified by the electrode layer 550B or the electrode layer 550C.

As described above, in the display panel 500 according to the fifth exemplary embodiment, the upper plate 501 includes one electrode layer 520, and the lower plate 502 includes a plurality of electrode layers 550A, 550B, and 550C. Alternatively, the lower plate 502 includes only one electrode layer, and the upper plate 501 includes a plurality of electrode layers. Further, each of the upper plate 501 and the lower plate 502 may include a plurality of electrode layers. In the alternative embodiments, the plurality of electrode layers formed in the upper plate or the lower plate may be configured of one electrode layer which entirely covers a corresponding substrate to perform a minor function, and the remaining electrode layers which partially cover a corresponding substrate to specify an image. In an alternative embodiment, the number of the plurality of electrode layers formed in the upper plate or the bottom plate may be changed, for example, may be 4, 5, 6, or the like.

The display panels 100, 200, 300, 400, and 500 described above may be mounted on an image display apparatus such as, as non-limiting examples, a television, a computer monitor, or an auxiliary panel, or the display panels may be mounted on a mobile device, a billboard, a window, or the like and used as an independent panel. A case in which the display panel described above is mounted on a television as an auxiliary panel will be described with reference to FIGS. 11 and 12.

Figure 11:
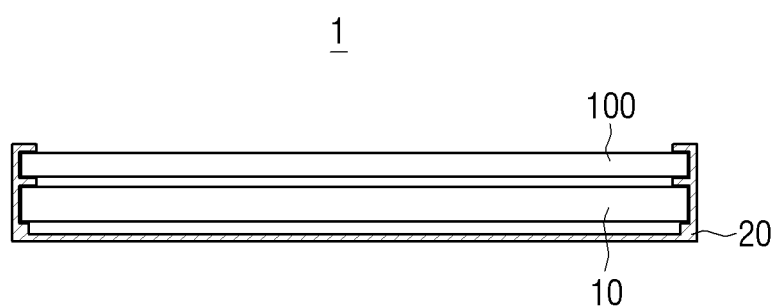
FIG. 11 is a schematic cross-sectional view illustrating a display apparatus according to an exemplary embodiment.
Figure 12:
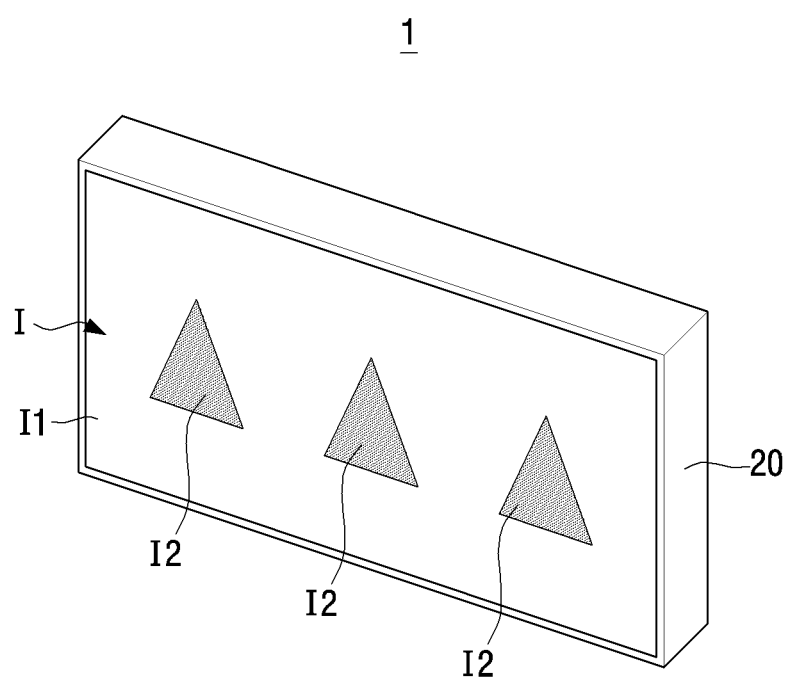
FIG. 12 is a perspective view illustrating the display apparatus of FIG. 11.

FIG. 11 is a schematic cross-sectional view illustrating a display apparatus according to an exemplary embodiment, and FIG. 12 is a perspective view illustrating the display apparatus of FIG. 11.

Referring to FIGS. 11 and 12, a display apparatus 1 according to an exemplary embodiment includes a first display panel 10, a second display panel 100, and a housing unit 20 configured to contain and support the first and second display panels 10 and 100.

The first display panel 10 is a panel configured to display unspecified images, and may display various images provided from an external apparatus in a wired manner or in a wireless manner. The first display panel 10 may display a static image as well as a moving image. The first display panel may be a liquid crystal display (LCD) panel, a plasma display panel (PDP), or an organic light-emitting diode (OLED) panel.

The second display panel 100 is the display panel illustrated in FIGS. 1 and 2. Therefore, as described above, the second display panel 100 may be driven in any one mode of the external light transmission mode which transmits external light and the external light reflection mode which reflects the external light, and the second display panel 100 may display one still image specified by the second electrode layer (see 150 of FIG. 2) when the display panel is driven in the external light reflection mode.

When the first display panel 10 is turned on (when the first display panel is in use), the second display panel 100 is driven in the external light transmission mode, and the second display panel 100 transmits an image provided from the first display panel 10 toward a front of the display apparatus 1. That is, when the first display panel 10 is in use, the second display panel 100 serves as a transparent window.

When the first display panel 10 is turned off (when the first display panel is out of use), the second display panel 100 is driven in the external light reflection mode, and the second display panel 100 displays an image I specified by the second electrode layer (see 150 of FIG. 2) as illustrated in FIG. 12. Alternatively, the image I may be specified by the first electrode layer, or by one or more of a plurality of first or second electrode layers.

The display apparatus 1 of FIG. 11 includes the second display panel 100 according to the first exemplary embodiment as the second display panel. Alternatively, the display apparatus 1 may include any one of the display panels 200, 300, 400, and 500 according to the second to fifth exemplary embodiments as the second display panel.

According to the display apparatus 1 of the exemplary embodiment, when the first display panel 10 is out of use, a specific image I is displayed in the second display panel 100, and thus the beauty of a space in which the display apparatus 1 is installed may be more improved. The specific image I is displayed using reflection of external light, and thus additional power is not substantially necessary to display the image I.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display panel configured to be driven in any one mode of an external light transmission mode and an external light reflection mode, the display panel comprising:
    an upper plate including a first substrate;
    at least one first electrode layer formed on an inner surface of the first substrate;
    a first polarizing film formed on an outer surface of the first substrate and having a first polarization axis;
    a lower plate including a second substrate;
    at least one second electrode layer formed on an inner surface of the second substrate;
    a second polarizing film formed on an outer surface of the second substrate and having a second polarization axis, wherein the second polarization axis is either perpendicular to or parallel to the first polarization axis;
    a liquid crystal (LC) layer between the upper plate and the lower plate; and
    an LC driving power supply connected between the first electrode layer and the second electrode layer and configured to selectively provide an LC driving voltage to the LC layer,
    wherein the LC layer has a first arrangement in which a polarization direction of incident light is changed by a preset angle in an entire region of the LC layer when the LC driving voltage is not applied, or a second arrangement in which the polarization direction of the incident light is maintained in at least a partial region of the LC layer, to which the LC driving voltage is applied, when the LC driving voltage is applied,
    wherein the first polarizing film includes an absorptive polarizing film, and the second polarizing film includes a reflective polarizing film,
    wherein when the LC driving power supply applies the LC driving voltage to the LC layer, an image corresponding to a shape of the any one of the at least one first electrode layer and the at least one second electrode layer is displayed by using reflection of external light,
    wherein any one of the at least one first electrode layer and the at least one second electrode layer partially covers the inner surface of a corresponding substrate on which it is formed to display the image, and where when the LC driving power supply applies the LC driving voltage to the LC layer, portions of the external light are reflected in the partial region of the LC layer to which the LC driving voltage is applied, the partial region corresponding to a region covered with the one of the at least one first electrode layer and the at least, one second electrode layer, and simultaneously, portions of the external light are transmitted in other region of the LC layer to which the LC driving voltage is not applied, the other region corresponding to a region uncovered with the one of the at least one first electrode layer and the at least one second electrode layer.

2. The display panel as claimed in claim 1, wherein the preset angle is 90 degrees or 270 degrees.

3. The display panel as claimed in claim 1, wherein the first polarization axis is perpendicular to the second polarization axis, and the LC driving voltage is provided to the LC layer when the display panel is driven in the external light reflection mode.

4. The display panel as claimed in claim 1, wherein the first polarization axis is parallel to the second polarization axis, and the LC driving voltage is provided to the LC layer when the display panel is driven in the external light transmission mode.

5. The display panel as claimed in claim 1, wherein the upper plate includes only one first electrode layer, and the lower plate includes only one second electrode layer.

6. The display panel as claimed in claim 5, wherein the one of the first electrode layer and the second electrode layer partially covers the inner surface of the corresponding substrate on which it is formed by providing a plurality of image specifying openings, and the other of the first electrode layer and the second electrode layer covers substantially all the inner surface of the corresponding substrate on which it is formed.

7. The display panel as claimed in claim 5, wherein the first electrode layer and the second electrode layer have the same shape, and each of the first and second electrode layers partially covers the inner surface of the corresponding substrate on which it is formed.

8. The display panel as claimed in claim 1, wherein the upper plate includes only one first electrode layer and the lower plate includes a plurality of second electrode layers, wherein the plurality of second electrode layers are electrically isolated from each other by at least one insulating layer.

9. The display panel as claimed in claim 8, wherein the first electrode layer covers substantially all the inner surface of the first substrate, and one layer of the plurality of second electrode layers covers substantially all the inner surface of the second substrate, and the other layers of the plurality of second electrode layers partially cover the inner surface of the second substrate.

10. The display panel as claimed in claim 9, wherein the one second electrode layer that covers substantially all the inner surface of the second substrate is a layer disposed closest to the second substrate among the plurality of second electrode layers.

11. The display panel as claimed in claim 9, wherein the other second electrode layers that partially cover the inner surface of the second substrate each have a respective shape, and wherein a shape of at least one of the other second electrode layers is different from a shape of at least one other of the other second electrode layers.

12. The display panel as claimed in claim 1, wherein the upper plate includes a plurality of first electrode layers and the lower plate includes only one second electrode layer, wherein the plurality of first electrode layers are electrically isolated from each other by at least one insulating layer.

13. The display panel as claimed in claim 12, wherein any one layer of the plurality of first electrode layers is formed to cover substantially all the inner surface of the first substrate, and the other layers of the plurality of first electrode layers are formed to partially cover the inner surface of the first substrate, and the second electrode layer is formed to cover substantially all the inner surface of the second substrate.

14. The display panel as claimed in claim 13, wherein the one first electrode layer that covers substantially all the inner surface of the first substrate is a layer disposed closest to the first substrate among the plurality of first electrode layers.

15. The display panel as claimed in claim 13, wherein the other first electrode layers that partially cover the inner surface of the first substrate each have a respective shape, and wherein a shape of at least one of the other first electrode layers is different from a shape of at least one other of the other first electrode layers.

16. The display panel as claimed in claim 1, wherein the upper plate includes a plurality of first electrode layers electrically isolated from each other by at least one insulating layer, and the lower plate includes a plurality of second electrode layers electrically isolated from each other by at least one insulating layer.

17. The display panel as claimed in claim 16, wherein any one layer of the plurality of first electrode layers is formed to cover substantially all the inner surface of the first substrate, and the other layers of the plurality of first electrode layers are formed to partially cover the inner surface of the first substrate, and any one layer of the plurality of second electrode layers is formed to cover substantially all the inner surface of the second substrate, and the other layers of the plurality of second electrode layers are formed to partially cover the inner surface of the second substrate.

18. A display apparatus, comprising:
a first display panel configured to display unspecified images; and
a second display panel disposed in front of the first display panel and configured to be driven in any one mode of an external light transmission mode and an external light reflection mode,
wherein the second display panel includes
an upper plate including a first substrate, at least one first electrode layer formed on an inner surface of the first substrate, and a first polarizing film formed on an outer surface of the first substrate and having a first polarization axis,
a lower plate including a second substrate, at least one second electrode layer formed on an inner surface of the second substrate, and a second polarizing film formed on an outer surface of the second substrate and having a second polarization axis, wherein the second polarization axis is either perpendicular or parallel to the first polarization axis,
a liquid crystal (LC) layer between the upper plate and the lower plate, and
an LC driving power supply connected between the first electrode layer and the second electrode layer and configured to selectively provide an LC driving voltage to the LC layer,
wherein the LC layer has a first arrangement in which a polarization direction of incident light is changed by a preset angle in an entire region of the LC layer when the LC driving voltage is not applied, or a second arrangement in which the polarization direction of the incident light is maintained in at least a partial region of the LC layer, to which the LC driving voltage is applied, when the LC driving voltage is applied, wherein the first polarizing film includes an absorptive polarizing film, and the second polarizing film includes a reflective polarizing film, wherein any one of the at least one first electrode layer and the at least one second electrode layer partially covers the inner surface of a corresponding substrate on which it is formed, wherein when the LC driving power supply applies the LC driving voltage to the LC layer, an image corresponding to a shape of the any one of the at least one first electrode layer and the at least one second electrode layer is displayed by using reflection of external light, and wherein when the LC driving power supply applies the LC driving voltage to the LC layer, portions of the external light are reflected in the partial region of the LC layer to which the LC driving voltage is applied, the partial region corresponding to a region covered with the one of the at least one first electrode layer and the at least one second electrode layer, and simultaneously portions of the external light are transmitted in other region of the LC layer to which the LC driving voltage is not applied, the other region corresponding to a region uncovered with the one of the at least one first electrode layer and the at least one second electrode layer.

19. The display apparatus as claimed in claim 18, wherein the preset angle is 90 degrees or 270 degrees.

20. The display apparatus as claimed in claim 18, wherein the second display panel is driven in the external light transmission mode when the first display panel is turned on, and the second display panel is driven in the external light reflection mode when the first display panel is turned off.

21. The display apparatus as claimed in claim 18, wherein the display apparatus is a television.

\* \* \* \* \*